US008191089B2

(12) United States Patent
Liao et al.

(10) Patent No.: US 8,191,089 B2
(45) Date of Patent: May 29, 2012

(54) SYSTEM AND METHOD FOR INSERTING ADVERTISEMENT IN CONTENTS OF VIDEO PROGRAM

(75) Inventors: Wei-Shing Liao, Taipei (TW);
Kuan-Ting Chen, Taipei (TW);
Winston H. Hsu, Taipei (TW)

(73) Assignee: National Taiwan University, Taipei (TW)

( * ) Notice: Subject to any disclaimer, the term of this patent is extended or adjusted under 35 U.S.C. 154(b) by 317 days.

(21) Appl. No.: 12/431,839

(22) Filed: Apr. 29, 2009

(65) Prior Publication Data

US 2010/0070996 A1    Mar. 18, 2010

(30) Foreign Application Priority Data

Sep. 10, 2008  (TW) ............................... 97134632 A

(51) Int. Cl.
*H04N 7/10*    (2006.01)
(52) U.S. Cl. .............................. 725/32; 725/35; 725/36
(58) Field of Classification Search .................. None
See application file for complete search history.

(56) References Cited

U.S. PATENT DOCUMENTS

| 7,337,456 | B1* | 2/2008 | Nihei ............................... 725/35 |
| 2005/0137958 | A1* | 6/2005 | Huber et al. ..................... 705/37 |
| 2009/0094637 | A1* | 4/2009 | Lemmons ....................... 725/32 |

OTHER PUBLICATIONS

Liao Wei-Shing, AdImage: Video Advertising by Image Matching and Ad Scheduling Optimizaton, Jul. 20-24, 2008, SIGIR' 08.*
Liao et al., AdImage: Video Advertising by Image Matching and Ad Scheduling Optimization, SIGIR '08, Jul. 20-24, Singapore.

* cited by examiner

*Primary Examiner* — Brian Pendleton
*Assistant Examiner* — Cai Chen
(74) *Attorney, Agent, or Firm* — Peter F. Corless; Steven M. Jensen; Edwards Wildman Palmer LLP

(57) ABSTRACT

The invention provides a system and method for inserting advertising in a video program, wherein appropriate advertisements are displayed at scheduled times in the process of a video program, characterized by matching image frames of a video program with object information and providing matching scores when an object information corresponding to an image frame; and inserting an advertisement corresponding to the object information having the matching score into the corresponding image frame in the video program.

16 Claims, 10 Drawing Sheets

SYSTEM AND METHOD FOR INSERTING ADVERTISEMENT IN CONTENTS OF VIDEO PROGRAM

FIELD OF THE INVENTION

The present invention relates to advertisement insertion systems and methods, and more particularly, to an advertisement insertion system and method that allows advertisements to be inserted into contents of video programs and displayed.

BACKGROUND OF THE INVENTION

The lifestyles of people have changed as a result of development of network and computer technologies. With the use of Internet, people no longer have to go out shopping but can buy various things online. Advertisers thus begin digital advertising during web browsing or multimedia playing processes in addition to the traditional print media (e.g. magazines, newspapers etc.) channels. As for multimedia playing process, the beginning or end of the video program is usually inserted with advertisements that are irrelevant to the video content. Irrelevancy of the advertisements to the content is not effective and may even annoy the audiences. As for web browsing processes, usually tags are used to compare ad contents and web page contents, such that when there is a textual relevancy between the two, the relevant advertisement is displayed. However, textual matching requires manual annotation, which is a time consuming process. Also, the texts produced are scarce and ambiguous, which is unfavorable for further analysis. Furthermore, the whole video program instead of individual image frames is subject to manual annotation. Thus, information conveyed by the images cannot accurately be grasped.

Therefore, there is a need for a solution that addresses the non-effectiveness of current advertisements, increases advertisement benefits of the advertisers, reduces disturbance of the advertisements to the users and other problems mentioned before.

SUMMARY OF THE INVENTION

In the light of forgoing drawbacks, an objective of the present invention is to provide a system and method for inserting advertisement content into a video program that are effective while providing maximum advertising benefit and reducing annoyance of the advertisements to users.

In accordance to the above and other objectives, the present invention provides a system and method for inserting advertisement content into a video program of the present invention. The advertisement inserting system of the present invention comprising: an object database for storing a plurality of object information; an advertisement database for storing a plurality of advertisements, and each of the advertisements correspondingly matching at least one of the object information; a video database for storing at least one video program; a matching module for obtaining an object information from the object database that correspondingly matches an image frame in the at least one video program, so as to a matching score S to the thus-obtained object information; and an advertising scheduling module for inserting an advertisement corresponding to the thus-obtained object information with the matching score S into the image frame in the at least one video program.

In another embodiment of the system for inserting advertisement content into a video program of the present invention, the system further comprises at least one bidding information correspondingly matching the at least geographic information in the geographic database, and the at least one bidding information comprises a bidding price b made by a bidder on the object information and a daily budget t, wherein the advertisement scheduling module is used for producing a scheduling score constituted of the object information bid by the bidder based on the bidding price b, a spent budget ratio g calculated from dividing a spent budget by the daily budget t, and the matching score S, and retrieving a predetermined number of the plurality of object information with highest scheduling scores, and wherein the advertising scheduling module is used for inserting the advertisement corresponding to the thus-obtained object information with a highest scheduling score into the image frame.

The method for inserting advertisement implemented by a processor comprises the steps of: storing a plurality of object information, a plurality of advertisements and at least one video program in a storage medium by the processor, each of the advertisements correspondingly matches at least one of the plurality of object information; matching the plurality of object information in the object database with an image frame in the at least one video program so as to obtaining an object information correspondingly matching the image frame in the at least one video program so as to obtain a matching score S to the object matched by the processor; and inserting an advertisement corresponding to the thus-obtained object information with the matching score S into the image frame in the at least one video program by the processor.

In another embodiment of the method for inserting advertisement content into a video program of the present invention, the method further comprises storing at least one bidding information correspondingly matching the geographic information, which the at least one bidding information includes a bidding price b made by a bidder on the object information and a daily budget t, producing a scheduling score constituted of the object information bid by the bidder based on the bidding price b, a spent budget ratio g calculated from dividing a spent budget by the daily budget t, and the matching score S, and retrieving a predetermined number of the plurality of object information with highest scheduling scores, wherein the advertisement correspondingly matching the object information with a highest scheduling score is inserted into the image frame.

Therefore, the system and method for inserting advertisement into a video program of the present invention provides more effective advertising by making the contents of the advertisements and the video content more relevant, reducing users watching video being annoyed by the appearance of the advertisements.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

The system of inserting advertisement into contents of a video program according to one embodiment of the present invention utilizes the time-dimensional characteristics of the video to insert one or more appropriate advertisements into the contents of the video program when the video program is played to increase effectiveness of the advertisements.

Figure 1:
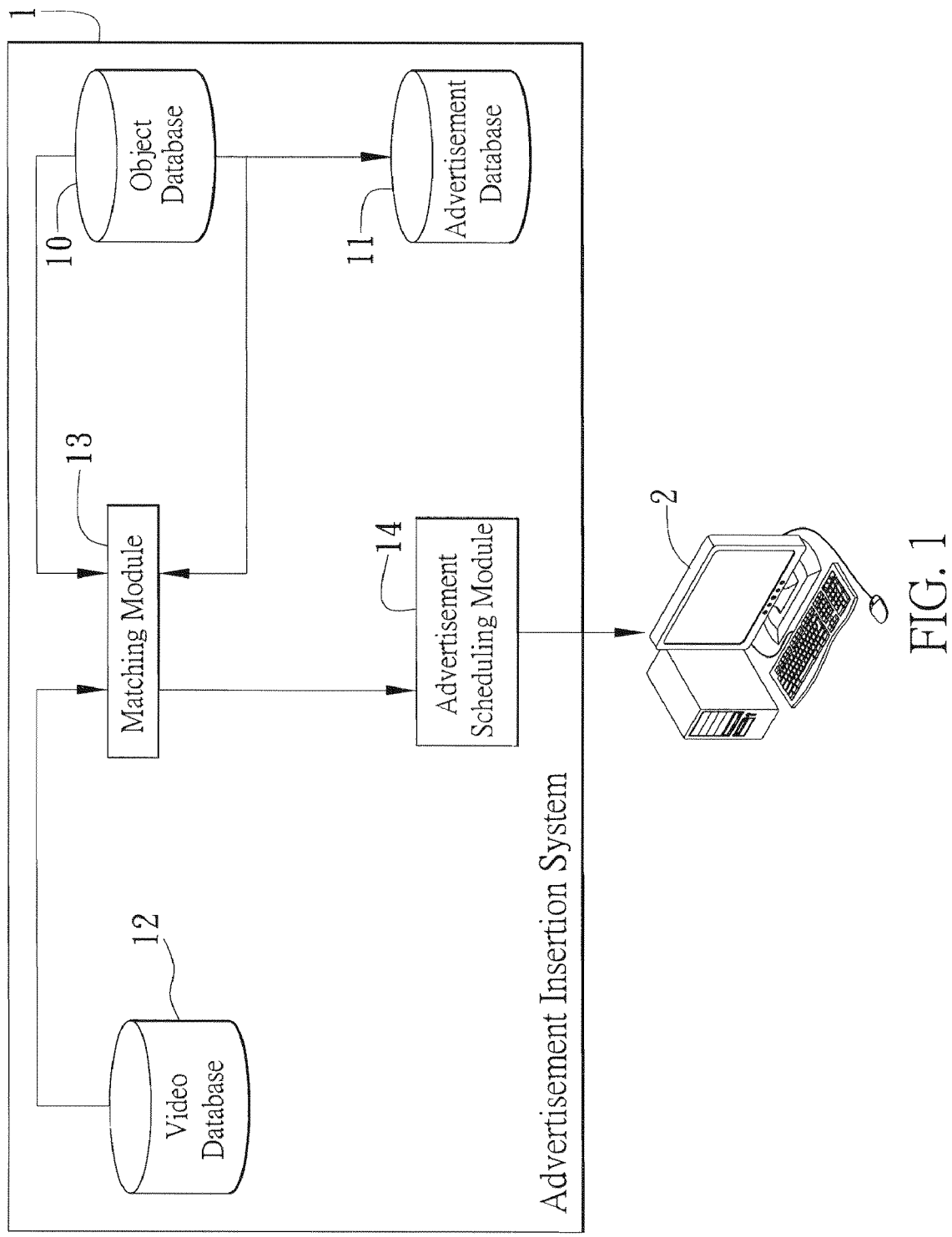
FIG. 1 is a schematic diagram depicting the basic structure of a system of inserting advertisement content into a video program according to a first embodiment of the present invention.

As shown in FIG. 1, a schematic diagram depicting the basic structure of a system of inserting advertisement into the contents of a video program according to a first embodiment of the present invention is shown. This advertisement insertion system 1 includes: an object database 10, an advertisement database 11, a video database 12, a matching module or advertisement scheduling module 14. The advertisement insertion system 1 is applicable to a network server (not shown), such that when a remote user downloads a video from the network server through the Internet (not shown) and plays at its terminal device 2, the appropriate advertisements are inserted into and played with the video program, increasing effectiveness of the advertisement while mitigating annoying feelings experienced by the users. It should be noted that the terminal device 2 is not limited to the computer shown in FIG. 1, but can, for example, be a portable electronic device, such as a mobile phone or Personal Digital Assistance (PDA).

The video database 12 is used for storing at least one video, for example, a TV program or personal program.

The object database 10 is used for storing a plurality of object information that can be an object and/or a scene with conceptual meaning to it. More specific, the object can be a trademark or company name in picture or texts, or even pictures of famous building. A meaningful scene can, for example, be one that shows snowing, raining, or people in a meeting or doing work out. These stored object information can be references for comparison and matching with played images, as will be described in more details later. It should be noted that the scenes in this embodiment do not limited to those specified above.

The advertisement database 11 is used for storing a plurality of advertisements, each of which correspondingly matches at least one object information. For example, an advertisement may be an advertisement about sport shoes from company A (or agent), and the object information correspondingly matching the advertisement may be company A's trademark or a scene with sport-related conceptual meaning. As a result, when such object information appears in an image frame of the video program to be played, the advertisement correspondingly matching to this object information can be obtained and played.

The matching module 13 is used to make a comparison between the image frames in the video program to be played and the object information in the object database 10. When the object database 10 obtains a match between the two, the matching object information is given a matching score.

One example of how to give a matching score in the advertisement insertion system according to one embodiment of the present invention is described below. When the matching module 13 obtains an object in the object database 10 that matches with a object appeared in an image frame, the proportion of an area occupied by the object corresponding to the object with respect to the display area of the image frame is calculated. The larger the area occupied by the object, the higher the matching score, and vice versa. More specifically, given that a female character in the image frames is wearing sports wear from brand A and a watch from brand B. The clothes and the watch have the trademarks of brands A and B, respectively. After comparison, it is determined that the area of the trademark of brand A on the sports wear is larger than the area of the trademark of brand B on the watch, so the matching score of trademark of brand A is higher than trademark of brand B. These matching scores are subsequently used for determining the order of the advertisements played matching the trademarks appeared in the video program, or as effective reference for sampled display of advertisements (advertisement samples).

Furthermore, apart from matching trademarks as mentioned above, the image frames can also be compared with scenes having conceptual meanings. For example, if an image frame presents a character soaking in a hot spring, "soaking in hot spring" may be a valid object for matching. The object database 10 may have previously stored a scene with an implication of soaking in hot spring. This scene with the implication of soaking in hot spring comes pretty close to the image frame where the female character is soaking in the hot spring, so this scene will have a relatively high matching score. Possible advertisements corresponding to the scene with a female character soaking in the hot spring may for example be promotions of Japan's famous hot springs, flight tickets to Japan's hot springs or accommodations in hot spring hotels. The matching scores are subsequently used for determining the order of the advertisements played matching the available scenes appeared in the video program, or as effective reference for sampled display of advertisements (advertisement samples).

The purpose of the matching score is that when the matching module 13 finds a plurality of object information (e.g. objects or scenes with conceptual meanings) in the object database 10 that match a particular image frame in a video program to be played, the advertisement scheduling module 14 is able to insert the advertisement corresponding to the object information with the highest mark among other matching object information into the image frame corresponding to the plurality of object information. This avoids the matching module 13 inserting an advertisement having wrong/irrelevant object information into the image frames, thereby the advertisement insertion system of the present invention increases the relevancy of the inserted advertisements and the video content played.

When the advertisement scheduling module 14 inserts, in an image frame, an advertisement corresponding to object information having a matching score and corresponding to the image frame, such that the advertisement can be played along with the video program.

It should be further noted that there are generally three modes of playing video program and advertisements: linear mode, non-linear mode and companion mode. In the linear playing mode, the advertisement is presented before, in the middle of, or after the video content is played, but not simultaneously. In the non-linear playing mode, the video content and the advertisement are played simultaneously. Both linear and non-linear modes have the option of being paired up with the companion mode, in which advertisements are played in text, picture, or video format around the window playing the video program.

Thus, during video program playing, the advertisement insertion system of the present invention may effectively and automatically find an insertion point using the matching module 13, so that the advertisements inserted into the video contents are more relevant and effective, optimizing the sales figures of the advertisement platform providers.

Figure 2:
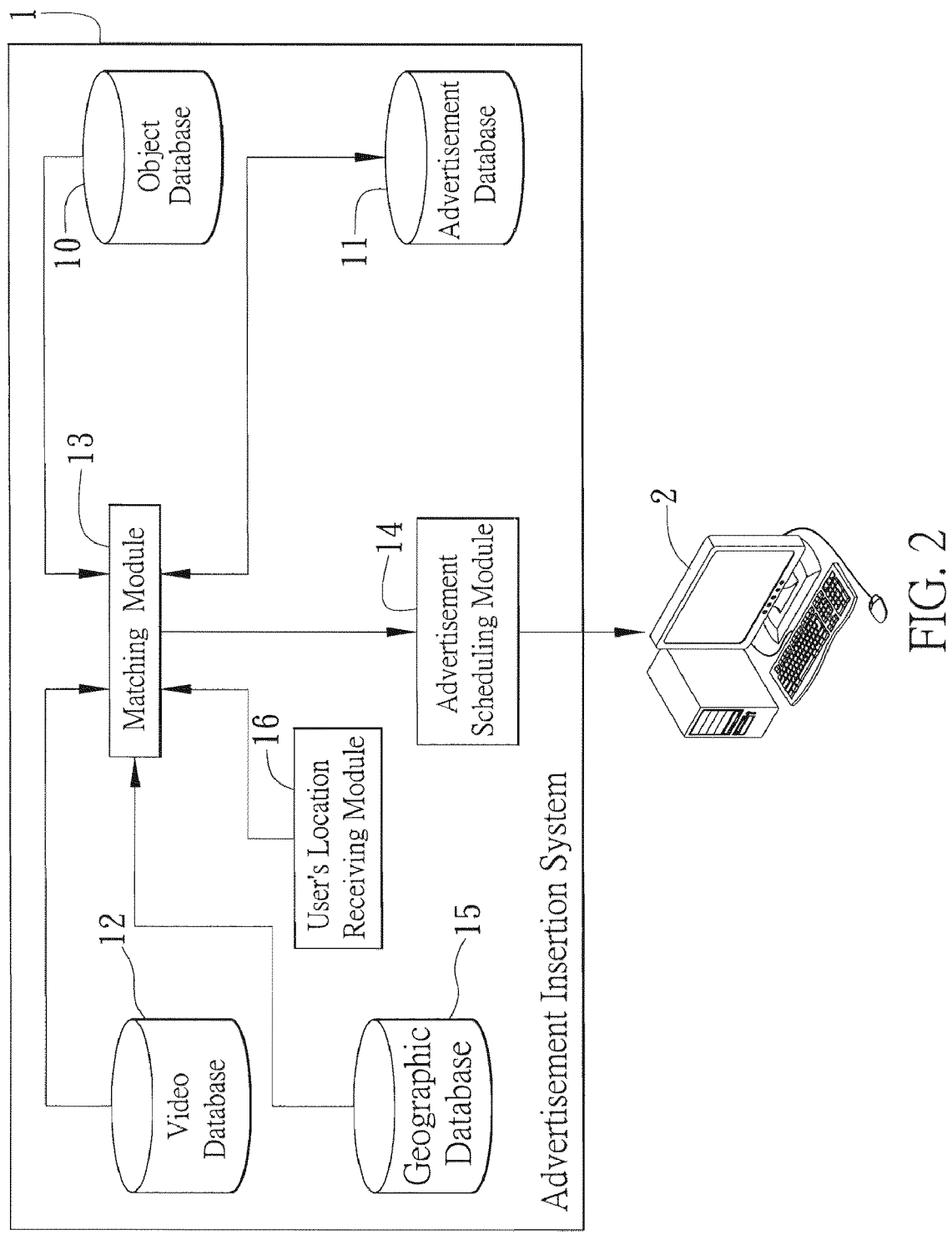
FIG. 2 is a schematic diagram depicting the basic structure of an advertisement insertion system according to a second embodiment of the present invention.

Furthermore, as shown in FIG. 2, a schematic diagram depicting the basic structure of an advertisement insertion system according to a second embodiment of the present invention is shown. The difference between this advertisement insertion system 1' and the previous system 1 is that the present system 1' has a geographic database 15 and a user location receiving module 16. The rest of the system is the same as the previous one, so only the differences are described.

The user location receiving module 16 is used for receiving the geographic location of the user. As for the ways of receiving geographical information, for example, the user at the terminal device 2 may directly input his/her location and upload it to the advertisement insertion system 1', or the terminal device 2 may be equipped with a GPS receiver, through which location information can be uploaded to the advertisement insertion system 1'. It is noted that the methods of obtaining geographical or positioning information are well known in the art, so will not be further described.

The geographic database 15 is used to store at least one of geographic information and at least one event information corresponding to the geographic information. The event information also corresponds to at least one of object information in the object database 10. For example, the geographic information may be Bo-Ching Rd, Taipei, and the event information corresponding to this geographic information may include a department store A and its sale promotion information, and a department store B and its sale promotion information. In the object database 10, the object information corresponding to department store A may, for example, include brand A's trademark, brand B's trademark, and a scene with swimming implication. There are also object information in the object database 10 correspond to department store B. When a user is at a metro station or a department store that is usually provided with a display device, such as a TV wall or a advertisement digital panel (equivalent to a terminal device 2), or user carries a electronic device with GPS functionality, such as a notebook, a cell phone or a PDA, the matching module 13 may perform a distance comparison of the geographic information of the terminal device 2 or user's electronic device received by the user location receiving module 16 and the geographic information stored in the geographic database 15. After comparison, if the location of terminal device 2 is closer to department store A and further from department store A, the objection information corresponding to department store A will have a relatively higher matching score than department store B. Thus, using the advertisement insertion system 1' of the present embodiment, a terminal device 2 near the user or an electronic device carried by the user allows the user to sees an advertisement about brand A's sports wear sold in department store A while watching a video program displayed by the terminal device 2 or the electronic device, thereby a real-time and personalized advertisement services can be provided. In other words, the users who are watching the video program may obtain promotional information of the stores near them through the terminal devices (or electronic devices mentioned before) so as for the users to receive more appropriate advertisements. In addition, the event information may also relate to activities other than sales promotions, such as musical events held by a concert hall or theater.

Thus, the geographic database may allow advertisers to target customers more effectively and precisely by localizing advertisements.

Figure 3:
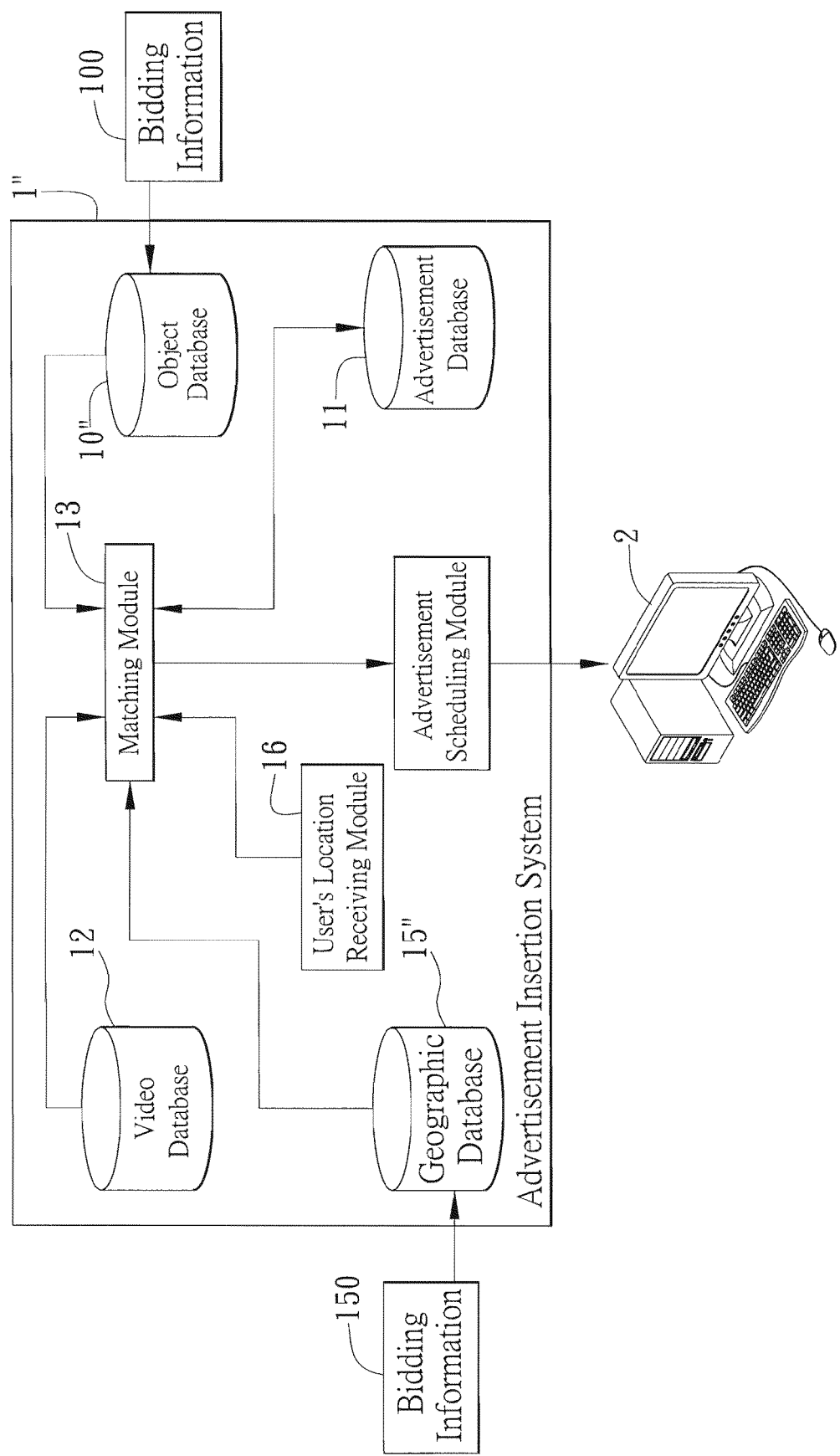
FIG. 3 is a schematic diagram depicting the basic structure of an advertisement insertion system according to a third embodiment of the present invention.

In FIG. 3, a schematic diagram depicting the basic structure of an advertisement insertion system according to a third embodiment of the present invention is shown. The difference between the system 1' and system 1" of the present embodiment is in that the object information stored in the object database 10" of the system 1" has corresponding bidding information 100, and the geographic information stored in the geographic database 15" has corresponding bidding information 150. The rest of the system is the same, and only the differences are highlighted below.

Figure 4:
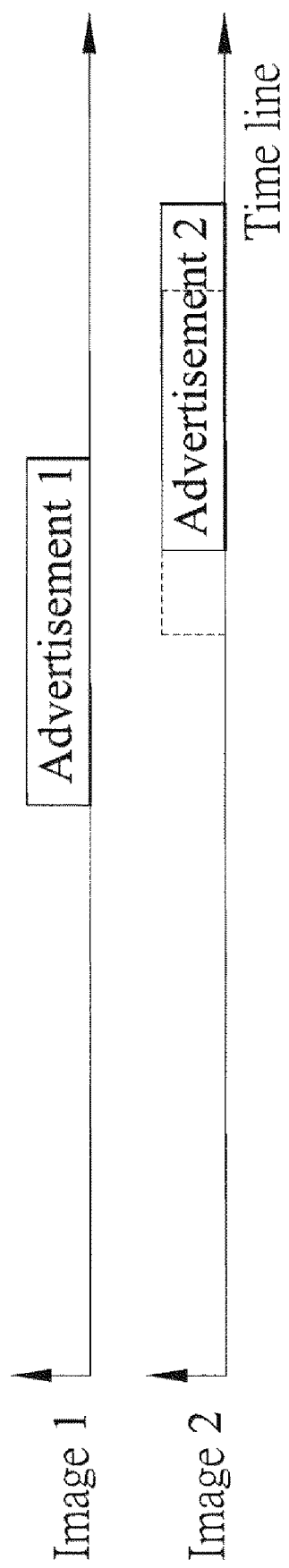
FIG. 4 is a timing diagram depicting advertisements displayed according to scheduling score ranking.

The bidding information (100, 150) is provided by bidders, such as ordinary advertisers. More specifically, advertisers interested in object information such as a corresponding particular advertising sites (e.g., an event location), objects, and scenes with particular conceptual meanings may bid on them. Since the advertisement insertion system 1" of the present embodiment adds in the bidding information (100, 150), it further puts a rule on the ranking (order being displayed) of the advertisements corresponding to the object information, so that the overall advertising system may achieve the maximum benefit. The bidding information (100, 150) includes a bidding price on the object information made by the bidder and a spent budget ratio g, which is the spent budget over the daily budget t. The daily budget t is inputted by the bidder for bidding the object information. The ratio g is obtained by the advertisement insertion system 1", by dividing the actual cost generated from the bidding of the object information with the daily budget t inputted by the bidder. The advertisement scheduling module 14 calculates scheduling scores of the available bidders according to the bidding prices b on the object information made by the bidders, the spent budget ratio g and the matching scores S described above. A first predetermined number of object information ranked from the highest scheduling scores to lowest scheduling scores are extracted, and the advertisements corresponding to these extracted object information will be later played. The algorithm for calculating the scheduling scores by the advertisement scheduling module 14 is $b \times \Psi(g) \times S$, where $\Psi(g)=1-e^{-(1-g)}$. When an image frame corresponds to geographic information in the geographic database 15" or the object information in the object database 10", the advertisement corresponding to the above information with highest scheduling score will be inserted into the image frame and later played with the video program. It should be further noted that, in the advertisement insertion system in FIGS. 1 and 2, the order of the advertisements played is based on the similarity (relevancy) of the image, size of the area occupied by the object or distance between the user and location of the advertised event. The advertisement will have a specified playing time, which is based on the matching scores. With the addition of the bidding information, the playing time will vary in accordance with the bidding price and the spent budget ratio g. For example, the object information with the highest schedule score can be played at the specified time with the video content, and the object information with lower scheduling scores will be scheduled to play at an earlier or later time than the specified time. The schedule scores determine the presentation time of the advertisements, thus solving the problem that the time at which advertisements are specified to be played overlap with one another. As shown in FIG. 4, after giving schedule scores, the advertisement Ad1 with the highest scheduling score will be played at the specified time, which is based on the matching score. The playing time of another advertisement Ad2 with a lower scheduling score overlaps with that of the advertisement Ad1, and thus is scheduled backward or forward. In other words, the advertisements are played according to ranking in the scheduling scores. An object information with a lower scheduling score is moved forward or backward with respect to the original playing order, which indicates the order of inserting the advertisements corresponding to the objection information corresponding to the image frames into the image frames in the video program to be played.

Figure 5:
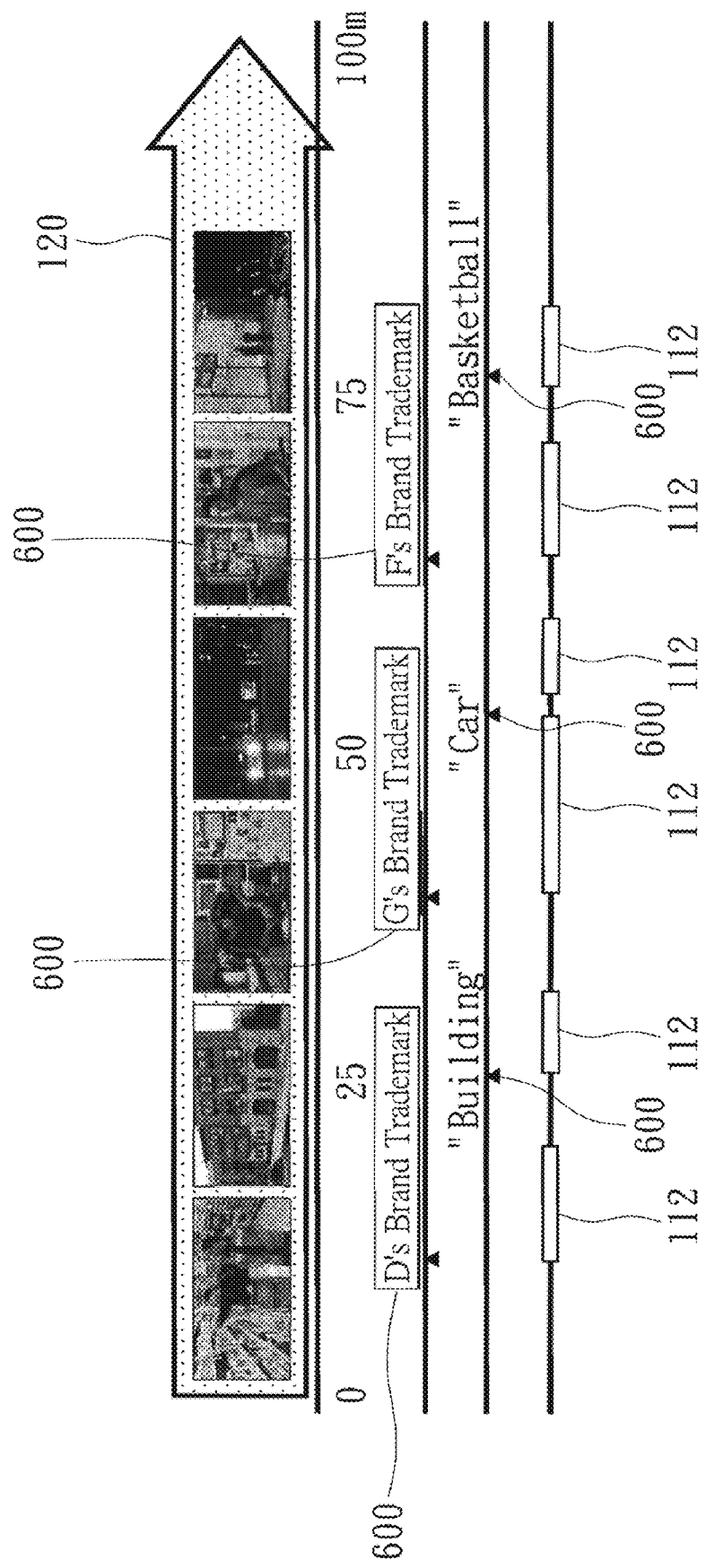
FIG. 5 is a schematic diagram illustrating inserting advertisements in a video program using the advertisement insertion system of the present invention.

After the above calibration process of the advertisement playing time, the schedule of video program 120 and advertisement 112 as shown in FIG. 5 is generated, wherein the video program 120 is played from beginning to end, advertisements will be insert into the periods labeled 600. These periods 600 are determined by comparing the image frames with the object information or geographic information in the object database or geographic database by the matching module 13. Therefore, advertisements can be played at the appropriate periods, causing users to make association with and be motivated to see the displayed advertisements.

Since the advertisement insertion system of the present invention automatically inserts advertisements into contents of the video program, too many advertisements may cause negative effects. In order to avoid this, in a preferred embodiment, the advertisement scheduling module 14 gives scheduling scores of the bidders based on the bidding price b, the spent budget ratio g and the matching scores S, and extracts a predetermined number of object information ranking from the highest scores to the lowest, this predetermined number is calculated to be not exceed a quarter of the overall video program playtime.

Figure 6:
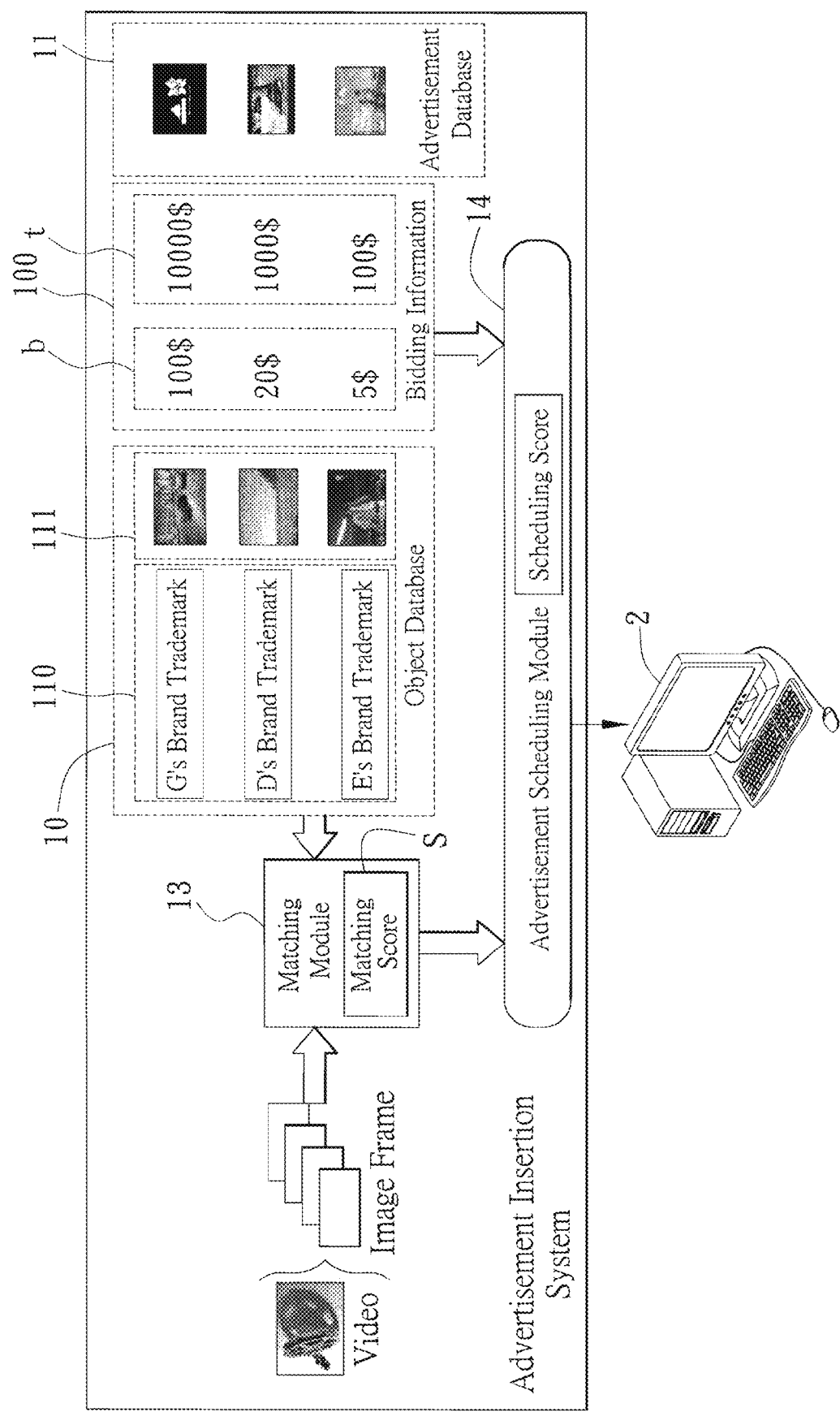
FIG. 6 is a schematic diagram depicting, more specifically, the advertisement insertion system according to the third embodiment of the present invention.

Next, referring to FIG. 6, a schematic diagram depicting advertisement insertion system according to the third embodiment of the present invention in more specific details is shown. It should be noted that the matching module 13 here only compares with the object database 10". However, geographic database 15" can also be compared. The object database 10" has a plurality of objects 110 and a plurality of scenes 111 with conceptual meanings. Whenever the matching module finds object information (object or scene) that corresponds to the image frame, it gives a matching score S to the object information. On the other hand, the advertisement scheduling module 14 gives a schedule score of this object information based on the bidding prices b, the spent budget ratio g, and the matching score S.

Figure 7:
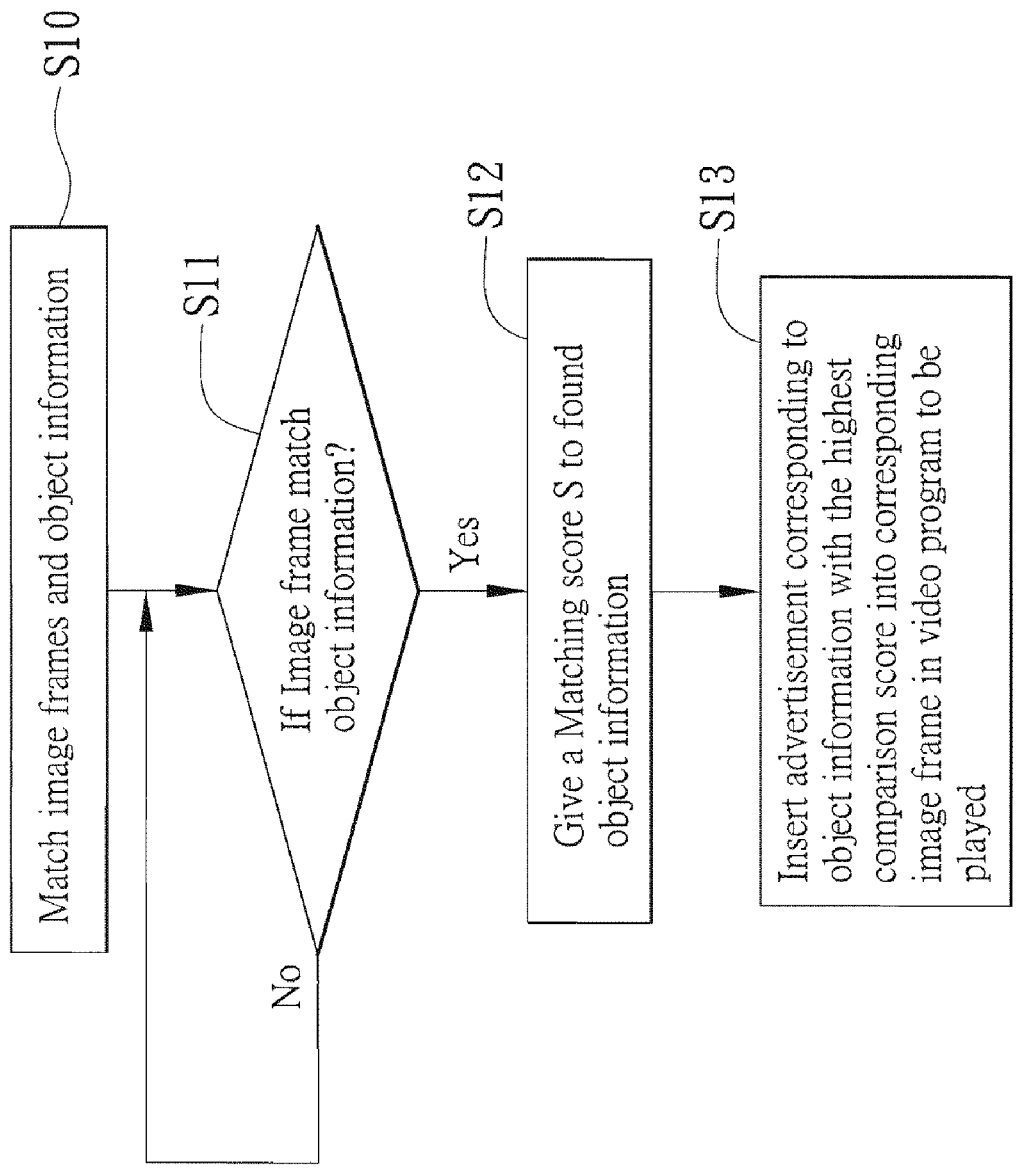
FIG. 7 is a flowchart illustrating the advertisement insertion method according to an embodiment of the present invention.

FIG. 7 is a flowchart illustrating the advertisement insertion method according to an embodiment of the present invention. The method according to the present invention is implemented with one or more processors in an electronic device, e.g., a computer, a cell phone or PDA. Before the method begins, the advertisement insertion system such as any of those described above are pre-stored with a plurality of objection information, a plurality of advertisements, and at least one video program, wherein the advertisement correspondingly matches at least one object information in the plurality of object information. It should be noted that, in another embodiment, a plurality of geographic information can be stored in advanced, which corresponds to at least one object information. However, the embodiment below is only explained in the context of object information. First, in step S10, the image frames are compared with the object information. Then, proceed to step S11.

In step S11, it is determined whether the stored object information correspondingly matches to one of the image frame. If so, then proceed to step S12; else, return to step S11 again.

In step S12, after the object information corresponds to the image frame is determined, it is given a matching score S. Then, go to step S13.

In step S13, an advertisement corresponding to the object information with the highest matching score is inserted into the video program.

Figure 8:
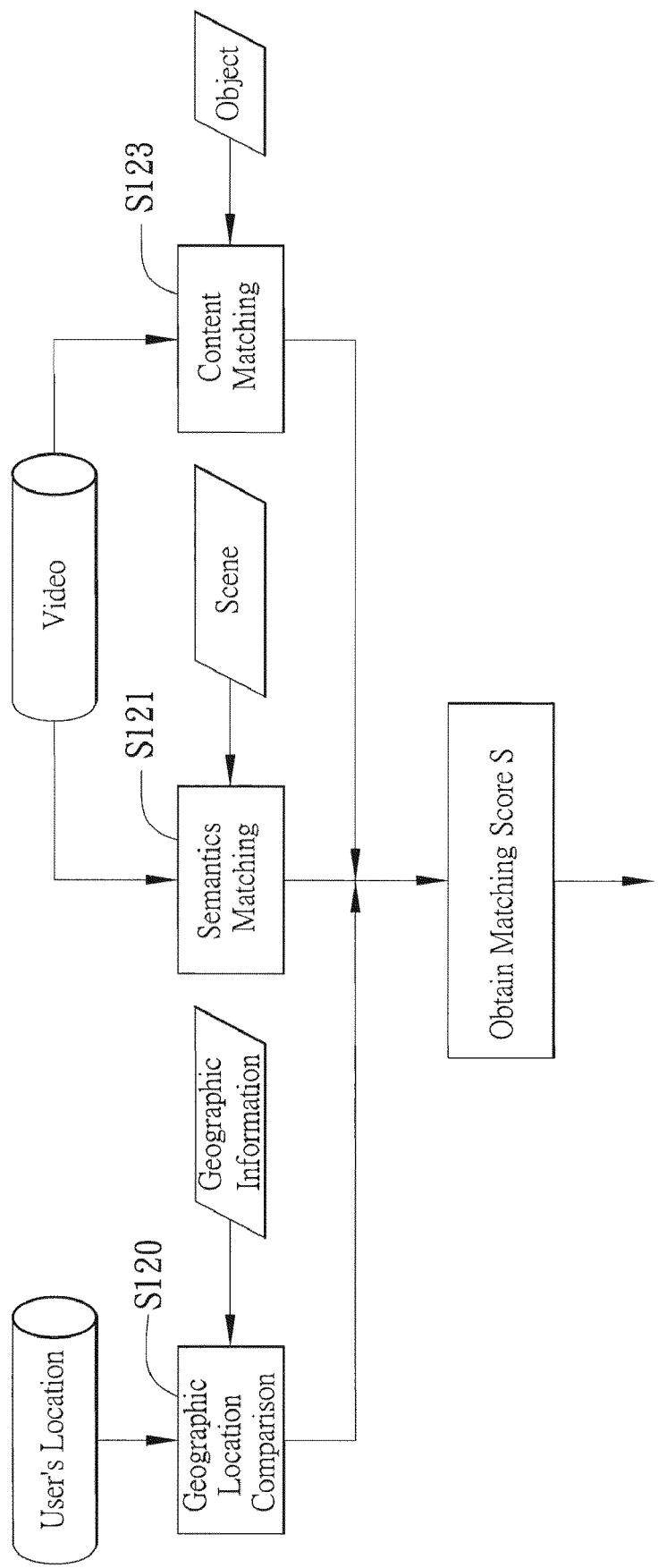
FIG. 8 is a flowchart illustrating the process of giving a matching score S in the advertisement insertion method of the present invention.

FIG. 8 is a flowchart illustrating the process of giving a matching score S in the advertisement insertion method of the present invention. In step S120, the distance between the user's location and geographical information in the geographic database is calculated, object information corresponding to event locations closer to the user's geographic location will be given higher matching scores S, while object information corresponding to event locations closer to the user's geographic location will be given lower matching scores S.

In step S121, when the stored object information includes scenes with conceptual meanings, the image frames are compared with the scenes, those scenes that closer match the image frames will be given higher matching score S, while those scenes that are less match with the image frames will be given lower matching score S.

In step S123, when the stored object information are objects, the image frames are compared with the object information to find a matching object, and the proportion of the area occupied by the object with respect to the total display area of the image frame is calculated. The larger the occupied area, the higher the matching score of the object is given, and vice versa.

Figure 9:
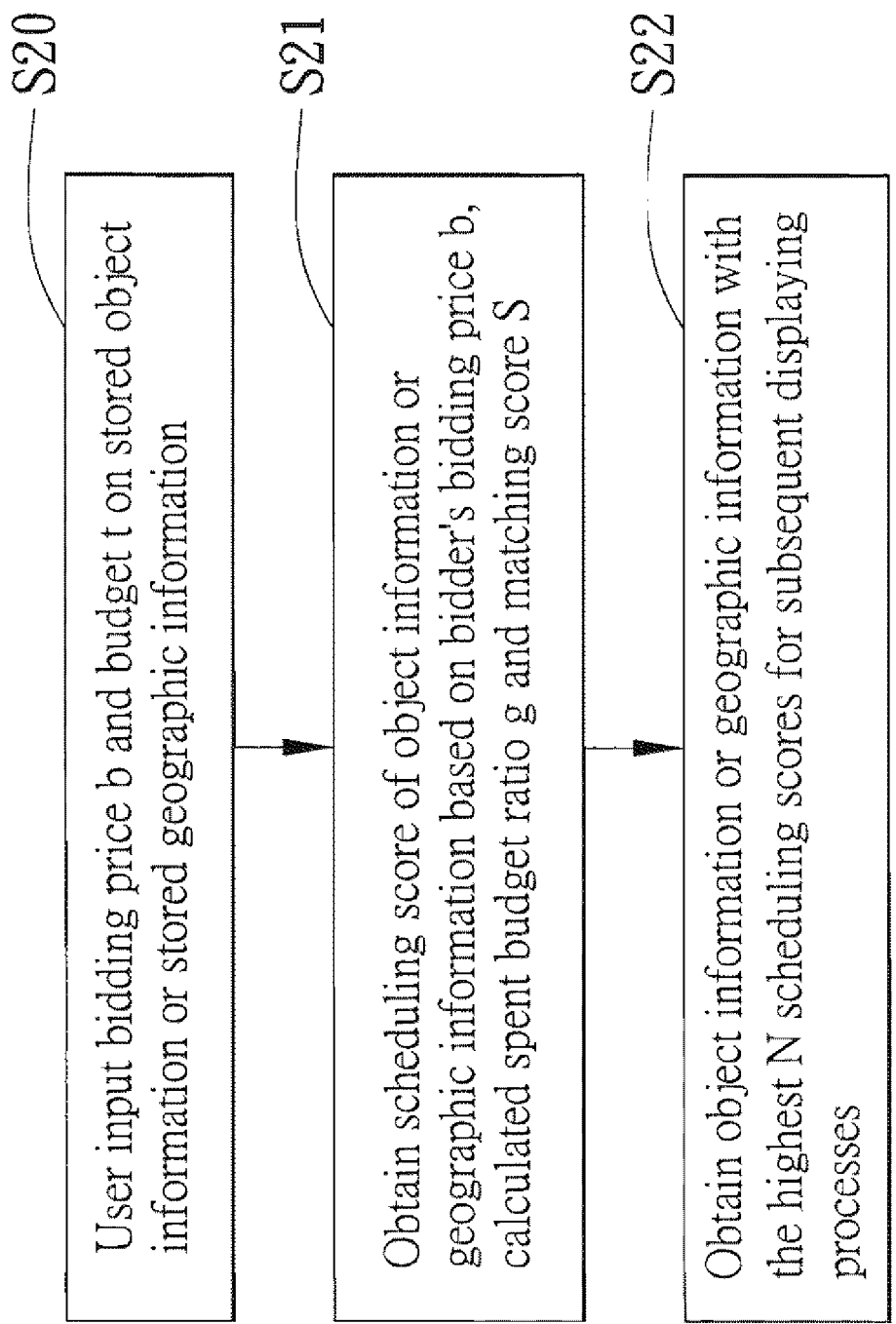
FIG. 9 is a flowchart illustrating the advertisement insertion method according to another embodiment of the present invention.

FIG. 9 is a flowchart illustrating the advertisement insertion method according to another embodiment of the present invention. The advertisement insertion method of the present invention further includes referring to the bidding information relating to the object or geographic information made by the bidders, and using them as basis for scheduling the order in which the advertisements corresponding to the object or geographic information are shown. First, in step S20, bidders input bidding price b and daily budget t for the stored object information and stored geographic information. Then, go to step S21.

In step S21, scheduling scores of the available bidders are calculated according to the bidding prices b on the object information made by the bidders, the spent budget ratio g (spent budge over the daily budget t) and the matching scores S described above. The algorithm for calculating the scheduling scores is $b \times \Psi(g) \times S$, where $\Psi(g)=1-e^{-(1-g)}$. Then, proceed to step S22.

In step S22, first N object or geographic information ranked from the highest scheduling scores to lowest scheduling scores are extracted. When an image frame corresponds to the object or geographic information, then the advertisement corresponds to the object or geographic information having the highest scheduling score is inserted into the image frame. As for those having lower scores, the advertisement corresponds to the object or geographic information having lower scheduling score are either inserted before or after the image frame, so as to avoid collision of more than one candidate advertisements showing at the same time.

Thus, the advertisement insertion method of the present invention allows appropriate insertion of advertisements having high relevancy with the video content being played while optimizing revenues brought by the advertisements.

Figure 10:
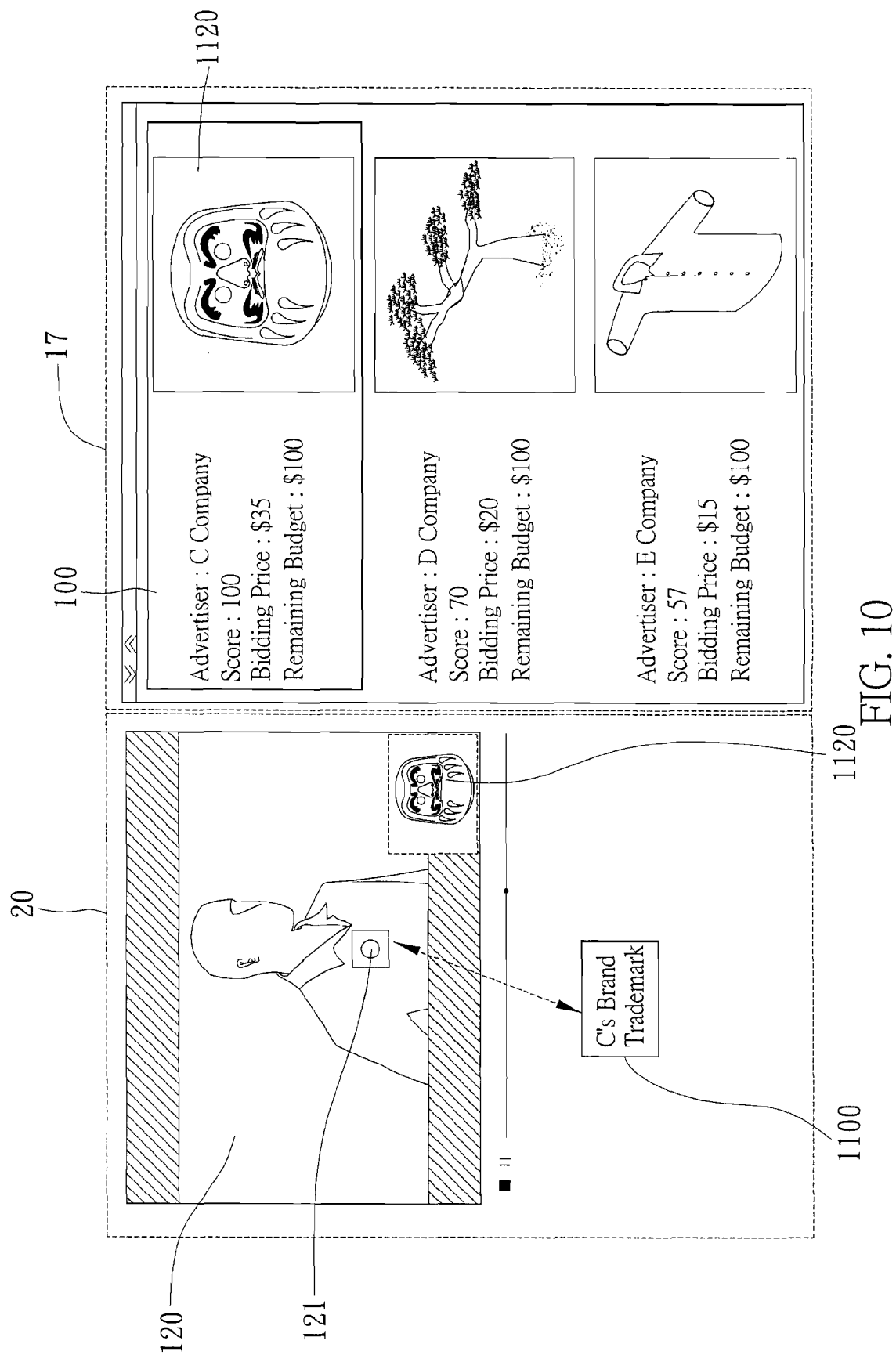
FIG. 10 is an exemplary output generated from the advertisement insertion method of the present invention.

Then, as shown in FIG. 10, an exemplary output generated from the advertisement insertion method of the present invention is shown. The display screen 20 shown on a display of a terminal device includes a video program 120 and an advertisement 1120 inserted. The advertisement is based on for example, when an image frame of the video program 120 has an object 121 that corresponds to brand C's trademark 1100, and then the advertisement 1120 corresponding to brand C's trademark is extracted from the database and displayed. Furthermore, scheduling scores can be calculated according to the bidding prices b inputted by the bidders and the spent budget ratio g. An advertisers (bidders) interface 17 is shown at the right-hand side of FIG. 10. The bidders may bid on interesting objects, scenes with conceptual meanings or corresponding geographic information (certain stores) and provide an advertisement that corresponds to the interesting object information. The order in which advertisements are displayed will be based on the scheduling scores described before, so as to avoid collision of playtime of the advertisements.

Therefore, the advertisement insertion system and method of the present invention is a more effective media by choosing and displaying advertisements that are relevant to the video content being played, thereby arousing interests of the audiences. Furthermore, when bidding information is used for advertisement scheduling, advertisement benefits can be optimized. Moreover, the present invention provides personalized advertisements by scoring advertisements based on comparing the geographic locations of the users and venues of the advertisement. As a result, the overall advertisement system may achieve the maximum commercial benefits.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. An advertisement insertion system, comprising:
an object database for storing a plurality of object information;
an advertisement database for storing a plurality of advertisements, and each of the advertisements correspondingly matching at least one of the object information;
a video database for storing at least one video program;
a matching module for obtaining an object information from the object database that correspondingly matches an image frame in the at least one video program, so as to produce a matching score S to the thus-obtained object information; and
an advertising scheduling module for inserting an advertisement corresponding to the thus-obtained object information with the matching score S into the image frame in the at least one video program,
wherein the object information is an object, allowing the matching module to obtain the object in the object database correspondingly matching the image frame and to calculate a ratio of an area occupied by the object with respect to a display area of the image frame, such that the larger the ratio is calculated, the higher the matching score S is given, and vice versa, and if a plurality of objects correspondingly matching the image frame are obtained, the advertising scheduling module is used for inserting the advertisement corresponding to one among the objects with a highest matching score into the image frame.

2. The advertisement insertion system of claim 1, wherein the object information is a scene with a conceptual meaning, allowing the matching module to obtain the scene that correspondingly matches the image frame, in which the more related the image frame is to the conceptual meaning of the scene, the higher the matching score S is given to the scene, and vice versa, and if a plurality of scenes correspondingly matching the image frame are obtained, the advertising scheduling module is used for inserting the advertisement corresponding to one among the scenes with a highest matching score into the image frame.

3. An advertisement insertion system comprising:
an object database for storing a plurality of object information;
an advertisement database for storing a plurality of advertisements, and each of the advertisements correspondingly matching at least one of the object information;
a video database for storing at least one video program;
a matching module for obtaining an object information from the object database that correspondingly matches an image frame in the at least one video program, so as to produce a matching score S to the thus-obtained object information;
an advertising scheduling module for inserting an advertisement corresponding to the thus-obtained object information with the matching score S into the image frame in the at least one video program;
a geographic database for storing at least one geographic information and at least one event information, and a user location receiving module for receiving a user's current geographic location, which an geographic information in the geographic database correspondingly matches the at least one event information at an event location which in turn corresponds to the at least one of the object information in the object database, wherein the matching module is used for obtaining a distance between the user's current geographic location received by the user's location receiving module and the event location correspondingly matching the geographic information in the geographic database, such that while the distance is shorter, the matching score S of the object information corresponding to the geographic information is higher, and vice versa; and
at least one bidding information for correspondingly matching the at least one geographic information in the geographic database, and comprising a bidding price b made by a bidder on the object information and a daily budget t, wherein the advertisement scheduling module is used for producing a scheduling score constituted of the object information bid by the bidder based on the bidding price b, a spent budget ratio g calculated from dividing a spent budget by the daily budget t and the matching score S, and retrieving a predetermined number of the object information with highest scheduling scores, and wherein the advertising scheduling module inserts the advertisement corresponding to the thus-obtained object information with a highest scheduling score into the image frame.

4. The advertisement insertion system of claim 3, wherein the advertising scheduling module is used for inserting the advertisement correspondingly matching the thus-obtained object information with a lower scheduling score before the image frame is obtained or after.

5. An advertisement insertion system comprising:
an object database for storing a plurality of object information;
an advertisement database for storing a plurality of advertisements, and each of the advertisements correspondingly matching at least one of the object information;
a video database for storing at least one video program;
a matching module for obtaining an object information from the object database that correspondingly matches an image frame in the at least one video program, so as to produce a matching score S to the thus-obtained object information;
an advertising scheduling module for inserting an advertisement corresponding to the thus-obtained object information with the matching score S into the image frame in the at least one video program; and
at least one bidding information for correspondingly matching at least one of the object information in the object database, and comprising a bidding price b made by a bidder on the object information and a daily budget t, wherein the advertisement scheduling module is used for producing a scheduling score constituted of the object information bid by the bidder based on the bidding price b, a spent budget ratio g calculated from dividing a spent budget by the daily budget t and the matching score S, and retrieving a predetermined number of the object information with highest scheduling scores, and wherein the advertising scheduling module is used for inserting the advertisement corresponding to the object information with highest scheduling score into the image frame.

6. The advertisement insertion system of claim 5, wherein the advertising scheduling module inserts the advertisement corresponding to the thus-obtained object information with a lower scheduling score before the image frame are obtained or after.

7. The advertisement insertion system of claim 3, wherein the predetermined number is determined by a quarter of the total playtime of the at least one video program.

8. The advertisement insertion system of claim 3, wherein the algorithm for giving a scheduling score is determined by $b \times \Psi(g) \times S$, wherein $\Psi(g) = 1 - e^{-(1-g)}$.

9. An advertisement insertion method implemented by a processor, comprising the steps of:
storing a plurality of object information, a plurality of advertisements and at least one video program in a storage medium by the processor, and each of the advertisements correspondingly matching at least one of the object information;
matching the plurality of object information in the object database with an image frame in the at least one video program so as to obtain an object information correspondingly matching the image frame in the at least one video program, so as to produce a matching score S to the thus-obtained object information matched by the processor; and
inserting an advertisement corresponding to the thus-obtained object information with the matching score S into the image frame in the at least one video program by the processor,
wherein the object information is an object allowing the matching module to obtain the object in the object database correspondingly matching the image frame and to calculate a ratio of an area occupied by the object with respect to a display area of the image frame, such that the larger the ratio is calculated, the higher the matching score S is given, and vice versa, and if a plurality of objects correspondingly matching the image frame are obtained, the advertising scheduling module is used for inserting the advertisement corresponding to one among the objects with a highest matching score into the image frame.

10. The advertisement insertion method of claim 9, wherein the object information is a scene with a conceptual meaning, allowing the matching module to obtain the scene that correspondingly matches the image frame, such that the more related the image frame is to the conceptual meaning of the scene, the higher the matching score S is given to the scene, and vice versa, and if a plurality of scenes correspondingly matching the image frame are obtained, the advertising scheduling module is used for inserting the advertisement corresponding to one among the scenes with a highest matching score into the image frame.

11. An advertisement insertion method implemented by a processor, comprising the steps of:
storing a plurality of object information, a plurality of advertisements and at least one video program in a storage medium by the processor, and each of the advertisements correspondingly matching at least one of the object information;
matching the plurality of object information in the object database with an image frame in the at least one video program so as to obtain an object information correspondingly matching the image frame in the at least one video program, so as to produce a matching score S to the thus-obtained object information matched by the processor;
inserting an advertisement corresponding to the thus-obtained object information with the matching score S into the image frame in the at least one video program by the processor;
storing a plurality of geographic information and at least one event information independently correspondingly matching to an geographic information of the plurality of geographic information, and receiving a user's current geographic location, wherein the at least one event information at an event location correspondingly matches to the at least one of the object information, in the step of matching the object information with the image frame in the at least one video program, further comparing a distance between the user's current geographic location and the event location correspondingly matching to the geographic information, such that while the distance is shorter, the matching score S of the object information corresponding to the geographic information is higher, and vice versa; and
storing at least one bidding information corresponding to the geographic information, which the at least one bidding information includes a bidding price b made by a bidder on the object information and a daily budget t, producing a scheduling score constituted of the object information bid by the bidder based on the bidding price b, a spent budget ratio g calculated from dividing a spent budget by the daily budget t and the matching score S, and retrieving a predetermined number of the plurality of object information with highest scheduling scores, wherein the advertisement correspondingly matching the object information with a highest scheduling score is inserted into the image frame.

12. The advertisement insertion method of claim 11, wherein the advertisement correspondingly matching the object information with a lower scheduling score is inserted before the image frame is obtained or after.

13. An advertisement insertion method implemented by a processor, comprising the steps of:

storing a plurality of object information, a plurality of advertisements and at least one video program in a storage medium by the processor, and each of the advertisements correspondingly matching at least one of the object information;

matching the plurality of object information in the object database with an image frame in the at least one video program so as to obtain an object information correspondingly matching the image frame in the at least one video program, so as to produce a matching score S to the thus-obtained object information matched by the processor;

inserting an advertisement corresponding to the thus-obtained object information with the matching score S into the image frame in the at least one video program by the processor; and storing at least one bidding information correspondingly matching the object information, which the at least one bidding information includes a bidding price b made by a bidder on the object information and a daily budget t, producing a scheduling score constituted of the object information bid by the bidder based on the bidding price b, a spent budget ratio g calculated from dividing a spent budget by the daily budget t and the matching score S, and retrieving a predetermined number of object information with the highest scheduling scores, wherein the advertisement correspondingly matching the object information with a highest scheduling score is inserted into the image frame.

14. The advertisement insertion method of claim 13, wherein the advertisement correspondingly matching the object information with a lower scheduling score is inserted before the image frame is obtained or after.

15. The advertisement insertion method of claim 11, wherein the predetermined number is determined by a quarter of the total playtime of the at least one video program.

16. The advertisement insertion method of claim 11, wherein the algorithm for giving a scheduling score is determined by $b \times \Psi(g) \times S$, wherein $\Psi(g)=1-e^{-(1-g)}$.

* * * * *